2,793,963

FREEZER ROOM REPAIRING METHOD

Michael Tym, Chicago, Ill.

No Drawing. Application April 20, 1953,
Serial No. 349,987

4 Claims. (Cl. 117—2)

This invention relates to repairing of the interiors of large commercial refrigerators and frozen food storage rooms and the like, and aims generally to improve the same. In such refrigerated quarters or compartments sub-freezing temperatures, i. e. below 32° F., are maintained, usually ranging from about 20° F. as an approximate upper limit to 20° F. or more below zero. From time to time pointing up and replacement of lining materials and masonry units, replacement or patching of insulating linings, replacement of trucking floors, and similar masonry work is required in such refrigerated quarters.

Prior to the present invention the standard procedure in the making of such repairs was to transfer the stored goods to other refrigerated quarters and defrost the quarters needing repair so that the repairs could be made at above freezing temperatures. This has been necessary because the Portland cement and like concrete conventionally used must be protected from freezing during setting thereof if satitsfactory bonds are to be obtained. As such setting, even with so-called quick-setting Portland cements, requires 24 hours or more after completion of the repairs, this standard procedure holds the refrigerated quarters out of service for several days at a time, at great economic loss both from the standpoint of warming and re-cooling of the warmed quarters, cost of transferring stored merchandise, and cost of alternative storage space.

By the present invention a method and means is provided for producing such repairs without defrosting the refrigerators, by which the replacement of tile and masonry and the patching or re-surfacing of floors and walls in the refrigerated quarters is effected with mortar that actually sets to an initial strong bond by freezing, and then, over a period of time undergoes changes, while in the frozen condition, that effect a permanent strong bond unaffected by freezing or thawing temperatures.

In testing and perfecting the invention it has been applied to the repairing of large commercial freezers owned by large meat packing firms with results that have proven highly satisfactory.

The compositions that I have discovered to be suitable for use in sub-freezing temperatures are water containing and obtain their initial set by freezing of contained water. The compositions in accordance with the invention employ filler, pigment, or aggregate materials that are varied depending on whether the compositions are to be used for priming over brick, concrete, wood, or asphalt sub-floors, for application to walls or ceilings, for securing tile or insulation or pointing up the same, or for the bodies of trucking floors, but in all cases the principal ingredient is an aqueous solution of sodium silicates, or a product commercially available as "liquid glass," which is a water solution of sodium silicates and sodium oxide, containing "free" or excess water above that corresponding to the water of crystallization of the dissolved materials, which materials I have discovered to be capable of quickly settting by freezing of the free or excess water at refrigeration temperatures (the lower the better), to afford a hard, immediately usable trucking surface, for example, and to then set up permanently, after a period of time, by gradual sublimation of the free or excess water from the solid ice state, leaving in the permanently set mortar only about that quantity of water corresponding to the water of crystallization of the sodium compounds. As the freezing point of the solutions is about the same as that of water, when they are employed in my composition at freezer temperatures or so-called "deep freeze" temperatures, they freeze solid very quickly as will be apparent from the following examples:

Example I

An embodiment of the composition particularly suitable for priming over brick, concrete, wood, or asphalt sub-floors, etc., comprises an aqueous solution of silicates of soda, water glass, or so-called "liquid glass," mixed with barium sulphate to about the consistency of buttermilk. A thin coat of this material on floors or walls freezes solid in less than an hour at 20° F., and more quickly at lower temperatures, and a thickly smoothed on coat freezes nearly as quickly. The freezer room is thus repaired without defrosting and the repaired areas can support traffic and otherwise be used almost as soon as the repairs are completed. The excess water is needed in the composition as prepared for application to facilitate working with the material, to assure proper wetting and adsorption on aggregates and coated surfaces, and provides water for the initial rapid freeze setting of the material for the purposes of the invention. As soon as the coating is frozen it commences to lose water vapor from its surface by sublimation and soon forms an extremely tough and dense surface skin, but it is not necessary to wait for the formation of such skin before working over the material under freezer temperatures, as it may be walked over, or worked on, as soon as its free water content has frozen. After formation of the skin the process of hardening to a permanently set state proceeds from the surface exposed to the air toward the center and bottom of the layer.

Example II

For a heavy coating, for example, say for the body of a 5" thick trucking floor, the composition preferably consists of a solution of silicates of soda, water glass, or "liquid glass" mixed with fine or coarse aggregates, preferably both. Sand, gravel, granite chips, wood chips, sawdust, asbestos, or any other chemically inert aggregate or aggregates are suitable for mixing with the silicates of soda to give hardness and resistance to wear. The proportions and sizes of aggregates to be used depends, of course, on the thickness of coating or body to be applied, the degree of hardness desired, and also the degree of absorbency of the aggregate; on the average about two gallons of sodium silicates solution is employed to about 150 pounds of aggregate. For trucking floors the consistency should be such as to flow freely and permit easy leveling of the surface with a straight edge before the water content of the dumped mass freezes and renders it unworkable. At the same time it is desirable to keep the content of liquid silicates of soda close to a usable minimum, because a considerable excess of it tends to cause shrinkage and crazing of the slab, and excessive softness and mushiness of the slab in case of defrosting before a full permanent set is attained. Thus in this application of the invention also, the excess water in the solution is desirable to provide workability with close to a minimum quantity of silicates, to assure good bonding to aggregates and sub-surfaces, and to assure the "quick-freeze set."

When this quick-freeze set occurs, the initial result, as above noted, is as though the aggregate had been soaked in water and frozen, and the material is as hard and load-sustaining as solidly frozen earth.

The second stage of setting, which starts immediately after exposure of the frozen surface to the air, as above noted, is the forming of a tough surface, growing tougher and deeper as more and more of the surplus water sublimes from the surface and body of the cement. As the formation of the skin greatly retards the sublimation, the process may proceed for a number of months, but the frozen floor may be trucked over as soon as its water content is frozen solid. While in hot air the hardening is accelerated, strange to say, in very cold air, say at 20° F. below zero, the hardening process seems to go faster than at zero temperature. Apparently hard freezing of thick sections from the top causes local contractions of the surface in sections usually about a square inch in area with slight crazing-like hair cracks between them, allowing the free water vapor from the lower parts of the slab to sublime at a faster rate. At the same time the mineral gels of the mix prevent growth of the hair cracks and largely fill them as the second stage of hardening proceeds.

When the materials are defrosted after the second stage of defrosting is completed, the set material exhibits an average compressive strength of over 3000 lbs. per square inch and a tensile strength of over 1000 lbs. per square inch.

*Example III*

For cementing tile, insulation, and masonry elements in place under deep freeze conditions, a mortar made generally as in Example II but with fine aggregate may be employed, and if desired, priming of the surfaces to be cemented together may be affected with a composition as in Example I.

*Example IV*

The priming composition as in Example I is also highly useful for coating and pointing wall surfaces in that it forms a quick frozen coating that soon converts to a tough sanitary skin.

The advantages of the invention for the frozen storage industry are indeed great, and include, among others, the following:

(*a*) No defrosting for repairs—the costs of which are enormous.

(*b*) No interference with operation of the plant.

(*c*) Overnight use of newly patched or surfaced freezer floors.

(*d*) Replacement of insulation on walls and ceilings without defrosting.

(*e*) The provision of a cement for the purposes described that does not disintegrate from the action of cold or moisture.

(*f*) The mixture can be used as soon as made, or can be stored for fairly long periods in airtight containers.

In the following claims, except where a different interpretation is required by context, the term "mortar" is to be interpreted as applicable to the full range of mixtures hereinabove disclosed, whether relatively thin and smooth with fine filler aggregate as in Example I, or heavily loaded with coarser aggregate as in the case of the flooring application mentioned. The term "waterglass," as is well known, refers to the water soluble silicates of sodium or potassium, or of both (G. & C. Merriam "Webster's New International Dictionary," 1920, page 2309), and is so used herein and it will be understood that while more expensive, the potassium silicates may be used with or in lieu of sodium silicates, without departing from the invention.

While there have been described herein what are at present considered preferred embodiments of the invention, it will be obvious to those skilled in the art that minor modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A method of repairing the interiors of freezers of the class described that consists essentially in applying to the area to be repaired a mortar consisting essentially of an aqueous solution of silicate of soda and a filler aggregate, freezing the still soft mortar by exposing it to a temperature of the order of 20° F. to —20° F. to initially solidify the mortar, and continuing such exposure to sub-freezing temperature while allowing the mortar to obtain a permanent set by sublimation from the frozen state of water content thereof in excess of the water of crystallization of the silicate.

2. A method of prime coating a surface in the interior of a chamber maintained at sub-freezing temperature of the order of +20 to —20° F., that consists essentially in applying to the surface, while maintaining it at sub-freezing temperature, a mortar consisting essentially of an aqueous solution of sodium silicate mixed with barium sulphate to form a spreadable mixture and continuing to maintain the sub-freezing temperature to effect rapid freezing of the water content of the mixture in excess of the water of crystallization thereof to effect initial setting by freezing of the mortar.

3. A method of repairing a trucking floor in the interior of a freezer room that consists in smoothing on such floor, while maintaining sub-freezing temperatures in the freezing room of the order of +32 to —20° F., a layer of mortar consisting essentially of an aqueous solution of sodium silicate and fine and coarse aggregate containing about two gallons of sodium silicate per 150 lbs. of aggregate and sufficient water to form a flowable, smoothable mixture, and maintaining the sub-freezing temperature to freeze the water in the mixture so that it may be trucked over before attaining a permanent set.

4. A method of repairing the interior of a large commercial freezer of the class described that consists in applying to the area to be repaired, while maintaining the same at sub-freezing temperatures of the order of +20 to —20° F., a mortar consisting essentially of an aqueous solution of waterglass and filler aggregate, continuing to maintain the sub-freezing temperatures in the freezer to effect rapid freezing of water content of the motar in excess of water of crystallization, to thus afford an initial set, and allowing the mortar to obtain a permanent set over a period of time while in the frozen state.

References Cited in the file of this patent

UNITED STATES PATENTS

| 63,618 | Devlan | Apr. 9, 1867 |
| 386,064 | Ferris | July 10, 1888 |
| 2,210,946 | Moore | Aug. 13, 1940 |

FOREIGN PATENTS

| 197,601 | Great Britain | of 1923 |
| 338,743 | Great Britain | of 1930 |